US008601057B2

(12) United States Patent
Han et al.

(10) Patent No.: US 8,601,057 B2
(45) Date of Patent: Dec. 3, 2013

(54) METHOD AND APPARATUS FOR CONTROLLING A MULTIMEDIA CONFERENCE BY AN APPLICATION SERVER

(75) Inventors: Yinjun Han, Shenzhen (CN); Bin Guo, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 175 days.

(21) Appl. No.: 13/003,459

(22) PCT Filed: Jul. 10, 2009

(86) PCT No.: PCT/CN2009/072722
§ 371 (c)(1),
(2), (4) Date: Mar. 29, 2011

(87) PCT Pub. No.: WO2010/003385
PCT Pub. Date: Jan. 14, 2010

(65) Prior Publication Data
US 2011/0185021 A1 Jul. 28, 2011

(30) Foreign Application Priority Data
Jul. 11, 2008 (CN) .......................... 2008 1 0068468

(51) Int. Cl.
*G06F 15/16* (2006.01)
(52) U.S. Cl.
USPC ........... 709/204; 370/260; 370/270; 370/312; 370/374
(58) Field of Classification Search
USPC ................ 709/217, 204–207, 227–229, 231, 709/236–237, 246; 370/260–262, 270–271, 370/312, 374, 376, 389–390, 395.2, 395.5, 370/395.64, 465
See application file for complete search history.

(56) References Cited

U.S. PATENT DOCUMENTS

| 2005/0160152 A1* | 7/2005 | Selin et al. ..................... 709/217 |
| 2007/0002865 A1 | 1/2007 | Burks et al. |
| 2007/0250569 A1* | 10/2007 | Mutikainen et al. .......... 709/204 |

FOREIGN PATENT DOCUMENTS

| CH | EP2088757 | * | 2/2008 |
| CN | 1460351 A | | 12/2003 |

(Continued)

OTHER PUBLICATIONS

J. Rosenberg et al., An Offer/Answer Model with the Session Description Protocol (SDP), RFC 3264, Network Working Croup, Jun. 2002, pp. 25.*

(Continued)

*Primary Examiner* — Andrew Chriss
*Assistant Examiner* — Peter Mak
(74) *Attorney, Agent, or Firm* — McGarry Bair PC (57) ABSTRACT

The present invention relates to a method and apparatus for controlling a multimedia conference by an application server, the method includes: in the multimedia conference, the application server divides the m-line in a received terminal session description protocol (SDP), message into two SDPs according to the type of media, and sends them respectively to an audio-video media server and a data media server, or assembles SDPs returned by the audio-video media server and the data media server into one SDP, and sends it to a terminal. The apparatus includes an application server, and the application server includes an SDP dividing module and an SDP assembling module. This invention simplifies the process of signaling interaction, reduces the consumption of the signaling interaction; better synchronizes the controlling of the conventional audio-video media and the data media, makes the realization of the multimedia client more simple; meanwhile, is compatible with the terminals traditionally not supporting data media.

12 Claims, 4 Drawing Sheets

(56) References Cited

FOREIGN PATENT DOCUMENTS

| | | |
|---|---|---|
| CN | 101202940 A | 6/2008 |
| CN | 101325504 A | 12/2008 |

OTHER PUBLICATIONS

Dynamicsoft, JSR-000141 Session Description Protocol (SDP) API, Java Community Process Program, Version 2.1, Jul. 25, 2002.*

* cited by examiner

METHOD AND APPARATUS FOR CONTROLLING A MULTIMEDIA CONFERENCE BY AN APPLICATION SERVER

CROSS-REFERENCE TO RELATED APPLICATIONS

This application is a National Phase application of International Application No. PCT/CN2009/072722, filed Jul. 10, 2009, which claims the benefit of Chinese Patent Application No. 200810068468.9, filed Jul. 11, 2008, both of which are incorporated herein by reference in their entirety.

FIELD OF THE INVENTION

The present invention relates to the multimedia conference technology of the IP Multimedia Subsystem (IMS), network or the Next Generation Network (NGN) network or the Internet network, in particular to a method and apparatus for controlling a multimedia conference by an application server (AS).

BACKGROUND OF THE INVENTION

Figure 1:
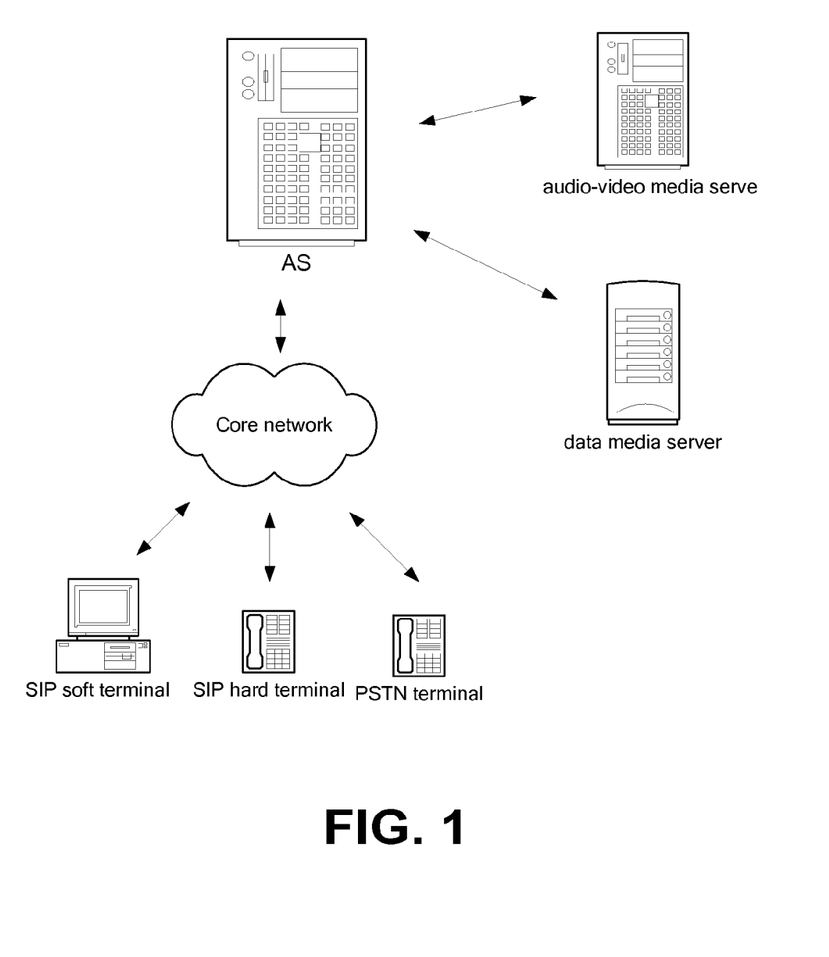
FIG. 1 is a schematic diagram of the networking structure of a multimedia conference system.

The traditional multimedia conference mostly refers to an audio-video conference, wherein even though some multimedia conferences have realized the function of a data conference, from the point of view of realization and signaling, the data conference and the audio-video conference are still independent, and the functions of the data conference and the audio-video conference are fused only from the point of view of users. One important reason for leading to such a realization way is that the audio-video media server and the data media server are independent, and it is hard to fuse those two together, therefore there is almost no any mature media server (MS) which can realize both audio-video media service and data media server. As shown in FIG. 1, it is the schematic diagram of the networking structure of multimedia conference system of the prior art, comprising a SIP (Session Initiation Protocol) soft terminal, a SIP hard terminal, an PSTN (Public Switched Telephone Network) terminal, a core network, an AS, an audio-video MS and a data MS. The AS is the control center of the whole conference system, which is directly connected to two MSs, connected to the terminals through the core network, controls the interaction between the terminals and the MSs at the signaling level, and completes a multimedia conference call. The SIP is employed both between the AS and the core network and between the AS and the MSs.

SUMMERY OF THE INVENTION

The technology problem to be solved by the present invention is to provide a method for controlling a multimedia conference by an AS in a multimedia conference system, and to provide an apparatus for controlling the multimedia conference, the present invention simplifies the process of signaling interaction, reduces the consumption of the signaling interaction, makes the realization of multimedia terminals more simple; meanwhile, is compatible with the terminals traditionally not supporting data media.

According to one aspect of the present invention, a method for controlling a multimedia conference by an AS is provided.

The method for controlling a multimedia conference by an AS according to the present invention comprises: in the multimedia conference, the AS divides m-line in a received terminal session description protocol, SDP, message into two SDPs according to the type of media, and sends them respectively to an audio-video media server and a data media server, or assembles SDPs returned by the audio-video media server and the data media server into one SDP, and sends it to a terminal.

When the conference initiating terminal of the multimedia conference initiates the conference, the method specifically comprises the following steps:

Step 21, the AS parses the SDP sent by the conference initiating terminal, obtains the m-line of the audio-video media and the data media, and classifies the m-line;

Step 22, the SDP sent by the initiating terminal is divided into two or more SDPs according to the classification of the m-line, the present invention takes dividing into two SDPs as an example, one of the two SDPs is an audio-video SDP, the other one is a data media SDP, and they are respectively sent to the audio-video media server and the data media server; it is to be noted that the case of dividing into more than 2 SDPs is also fallen into the scope of the present invention.

Step 23, when the AS has received one SDP returned by one media server, and not yet received another SDP returned by the other media server, the AS saves the SDP of the former media server and waits for the SDP of the latter media server, and extracts the SDP of the former media server when receiving the SDP of the latter media server;

Step 24, the AS assembles the SDPs returned by the audio-video media server and the data media server into one SDP, and sends it to the conference initiating terminal.

When the conference initiating terminal of the multimedia conference needs to call a member, the method specifically comprises the following steps:

Step 31, the AS sends a SIP message to the member terminal, and obtains the SDP of the member terminal;

Step 32, the AS parses the SDP sent by the member terminal, obtains the m-line of the audio-video media and the data media, and classifies the m-line;

Step 33, the SDP sent by the member terminal is divided into two SDPs according to the classification of the m-line, and the two SDPs are sent respectively to the audio-video media server and the data media server;

Step 34, when the AS has received one SDP returned by one media server, and not yet received another SDP returned by the other media server, the AS saves the SDP of the former media server and waits for the SDP of the latter media server, and extracts the SDP of the former media server when receiving the SDP of the latter media server;

Step 35, the AS assembles the SDPs returned by the audio-video media server and the data media server into one SDP, and sends it to the member terminal transparently.

After the multimedia conference has been successfully initiated, if the conference initiating terminal needs to switch off a type of conference media channel, then step 24 is further followed by the following steps:

Step 41, the conference initiating terminal sets the port of the m-line corresponding to the media channel to be switched off in the SDP to be 0, and sends it to the AS via the SIP message;

Step 42, the AS compares the media type of the received SDP with the media type of the conference currently in progress, and extracts the m-line with the port being 0 in the SDP, forms one new SDP, and sends the new SDP to a corresponding media server to notify it to switch off the corresponding media channel;

Step 43, the AS assembles the SDPs of the two media servers corresponding to a member terminal into one new SDP, sends it to the member terminal to notify it to switch off the corresponding media channel, and extracts the m-line corresponding to the media server of the media channel to be switched off in the SDP of the member terminal, forms one new SDP, and sends it to the corresponding media server; the port of the m-line corresponding to media type to be switched off in the new SDP is 0.

After the multimedia conference has been successfully initiated, if the conference initiating terminal needs to add a type of media channel, then step 24 is followed by the following steps:

Step 51, the AS switches on the media channel corresponding to the media server with the port of the m-line being 0, according to the SDP sent by conference initiating terminal;

Step 52, the AS notifies the member terminal supporting the type of media to switch on the corresponding media channel.

The method for dividing SDP is:

first extracting the session description portion of the SDP sent by the conference initiating terminal, copying it directly to the divided SDP as the session description portion; then classifying the m-line of the SDP transmitted by the conference initiating terminal into an m-line set of audio-video media and an m-line set of data media according to the media type, and copying the m-line set of audio-video media and the m-line set of data media respectively to the corresponding divided SDPs as the media description portion.

The method for assembling SDP is:

first extracting the session description portion of the SDP returned by the audio-video media server as the session description portion of an assembled SDP, then according to the order of the m-line in the SDP of the conference initiating terminal, assembling the m-line of the SDP returned by the audio-video media server and the data media server as the media description portion of the assembled SDP, if there is no corresponding m-line in the SDP returned by the audio-video media server or the data media server, setting the port of the m-line to be 0.

In the method, for the terminal without data media capability, the AS merely interactively negotiates with the audio-video media server corresponding to the terminal during the whole media negotiation process.

In the method, if one media type needs to be switched off by the conference initiating terminal, the AS directly sends an ending message to the corresponding media server, and uses the SDP of the other media server to form an SDP, in which the port of the m-line of the media type of a switched-off media server is 0, sends the SDP to the conference initiating terminal, then switches off the media type corresponding to each member; if the whole conference needs to be switched off by the conference initiating terminal, the AS sends an ending message to all media servers, and forms an SDP with all ports of m-line being 0 and transmitting it to the conference initiating terminal, then sends an ending message to each member and the media server corresponding to it.

According to another aspect of the present invention, an apparatus for controlling the multimedia conference is provided.

The apparatus for controlling a multimedia conference according to the present invention comprises an application server, and the application server further comprises an SDP dividing module and an SDP assembling module, the SDP dividing module is used to divide the SDP sent by a terminal into two SDPs according to the classification of the m-line; the SDP assembling module is configured to assemble the SDPs returned by an audio-video media server and a data media server into one SDP.

Based on the SIP protocol, the present invention provides a solution, in which the AS controls the audio-video MS and the data MS at the same time, through assembling divided SDPs. This invention simplifies the process of signaling interaction, reduced the consumption of the signaling interaction; better synchronizes the controlling of the traditional audio-video media and the data media, makes the realization of the multimedia client more simple, meanwhile, is compatible with the terminals traditionally not supporting data media.

DETAILED DESCRIPTION OF THE EMBODIMENTS

The present invention will be further detailed hereinafter in connection with the drawings and preferred embodiments.

Method Embodiments

Figure 2:
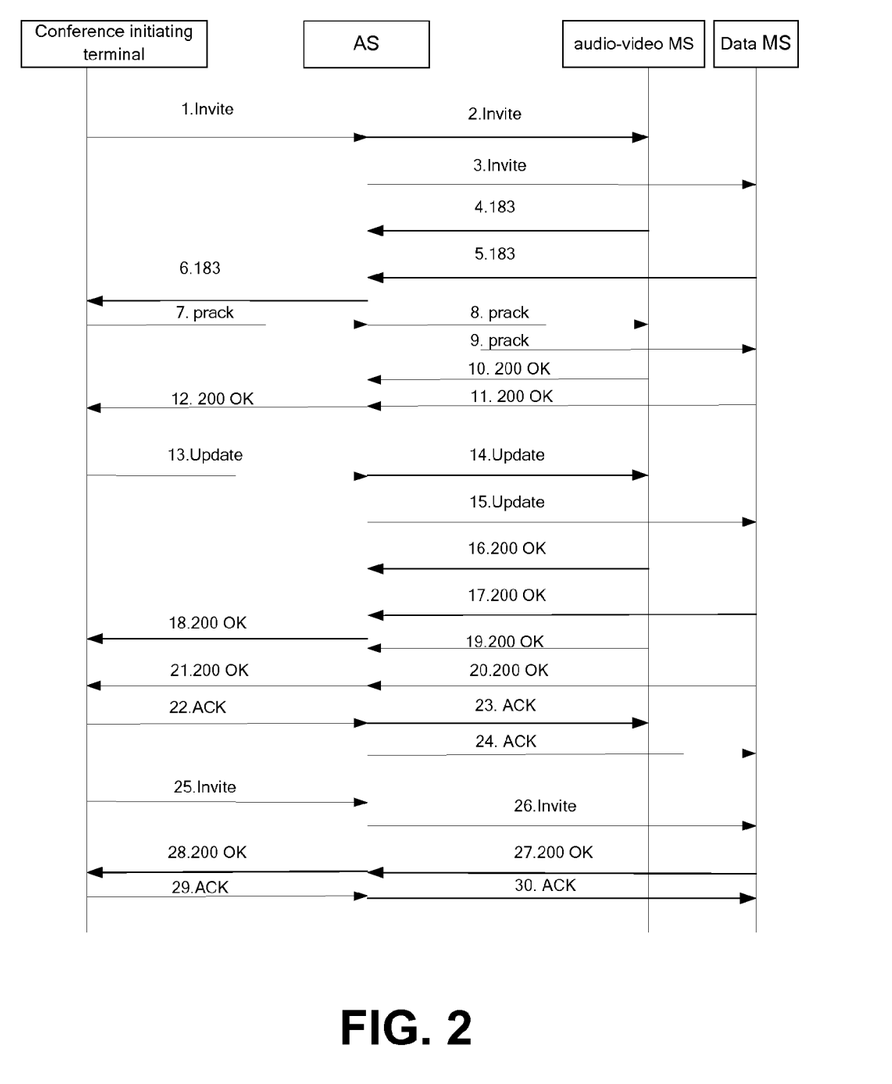
FIG. 2 is a flow chart of the signaling when a conference initiating terminal requests to initiate a conference and switch off a type of conference media channel.

According to the embodiment of the present invention, a method for controlling a multimedia conference by an AS is provided. FIG. 2 is the flow chart of the signaling when a conference initiating terminal requests to initiate a conference and switch off a type of conference media channel. Referring to FIG. 2, further detailed description will be made on particular realization of the AS during the processing of each signaling thereinafter:

1, the conference initiating terminal sends out a conference initiating request through an Invite message whose SDP carries the media type (audio, video, application, wb) of the conference that the conference initiating terminal intends to initiate; the AS saves the SDP of the message after receiving the Invite message, then parses it to obtain the m-line of the SDP, and classifies the m-line into audio-video type (audio, video) and data type (application, wb), the SDP is divided into two new SDPs according to the classification, the divided SDP shares the same session description portion with the original SDP, and the m-line of the original SDP is divided into the two new SDPs according to the classification;

2, the AS transmits the SDP with the m-line being (audio, video) to an audio-video MS through the Invite message;

3, simultaneously with the above Action 2, the AS transmits the SDP with the m-line being (application, wb) to a data MS through the Invite message;

4, the audio-video MS first returns an answer SDP through a 183 message, the AS saves the SDP after receiving it and blocks the flow from continuing at the same time, so as to wait for the answer SDP from the data MS.

When the media negotiation needs distributing and assembling, because the two MSs are two different devices, their SIP signaling needs to be synchronized, the AS executes synchronization according to the SDP status (Send Offer, Recv Answer) of each MS and SIP signaling. When the AS sends an Invite message containing SDP to individual MSs, if both MSs return the 183 message containing an answer SDP or a 200 OK message containing an answer SDP, then the two answer SDPs, when being received, will be directly assembled, and a same SIP message (183 or 200 OK) is used to send the answer SDP to the terminal; if the first MS returns a 200 OK message containing SDP, then the AS waits for another answer SDP of another MS, if the SIP message returned by the second MS is different from that by the first MS, i.e., the message returned by the second MS is a 200 OK message containing an answer SDP, then after receiving the 200 OK message containing an answer SDP returned by the second MS, the AS sends a PRACK message to the first MS to notify to continue the flow. After the first MS returns the 200 OK message containing an answer SDP, the assembly is performed, and the 200 OK message is used to send an answer SDP to the terminal.

5, the data MS returns an answer SDP through a 183 message, the AS assembles the received SDP and the saved SDP from the audio-video MS according to the order of m-line in the SDP of the conference initiating terminal;

the method for assembling the SDP comprises: first extracting the session description portion of the answer SDP returned by the audio-video MS as the session description portion of the assembled SDP, then assembling the m-line of the answer SDPs returned by the audio-video MS and the data MS into the media description portion of the assembled SDP according to the order of the m-line in the SDP of the conference initiating terminal, wherein if the answer SDP returned by the audio-video MS or the data MS has no corresponding m-line, then the port of the m-line is set to be 0;

6, the AS sends the assembled SDP in Action 5 as an answer SDP to the terminal through a 183 message, and resumes the flow relating to the audio-video MS;

7-12, the AS negotiates with the conference initiating terminal and the MS to complete the signaling flow of PRACK/ 200 OK;

13, the conference initiating terminal completes resource reservation, and sends an Update message to inform the AS that the resource reservation has been completed, and the AS processes the SDP in a way similar with that in Action 1 upon receiving the Update message;

14-15, as Actions 2-3, the AS sends the SDP of the conference initiating terminal to the audio-video MS and the data MS via the Update message;

16-18, as Actions 4-6, the AS assembles the answer SDPs, which are returned by the audio-video MS and the data MS through a 200 OK message, and sends an assembled answer SDP to the conference initiating terminal through the 200 OK message;

19, the audio-video MS first issues a final response of 200 OK message, and the AS blocks the flow from continuing upon receiving the response, so as to wait for a final response from the data MS;

20-21, the negotiation between the AS and media devices has been successful after the AS received the final response of 200 OK message from the data MS, and the AS sends the final response of 200 OK message to the conference initiating terminal; 22-24, the final response is acknowledged by an ACK message;

25, the conference initiating terminal needs to switch off the type of wb media channel and sends ReInvite message to the AS, wherein the conference initiating terminal indicates the intention through the port number being 0 in m=wb parameter of the SDP contained in the ReInvite message; after receiving the SDP, the AS compares it with the previous SDP to obtain the media channel that the conference initiating terminal intends to switch off, however, m=wb media channel is data media type, thus the AS merely needs to negotiate with the data MS; the AS updates the saved SDP of the conference initiating terminal, and meanwhile extracts the data media type from the SDP to assemble one new SDP;

26, the AS sends the SDP assembled in Action 25 via a reInvite message to the data MS in order to notify the wb media channel to switch off;

27, upon receiving the answer SDP returned by the data MS via the 200 OK message, the AS assembles the negotiated SDP of the audio-video MS and the received SDP of the data MS into an SDP for answering the conference initiating terminal;

28, the AS answers the conference initiating terminal with the assembled SDP in Action 27 via the 200 OK message;

29-30, the conference initiating terminal and the AS send an ACK message to acknowledge the 200 OK message, and the media negotiation of switching off the media channel between the conference initiating terminal and the MS is completed.

Figure 3:
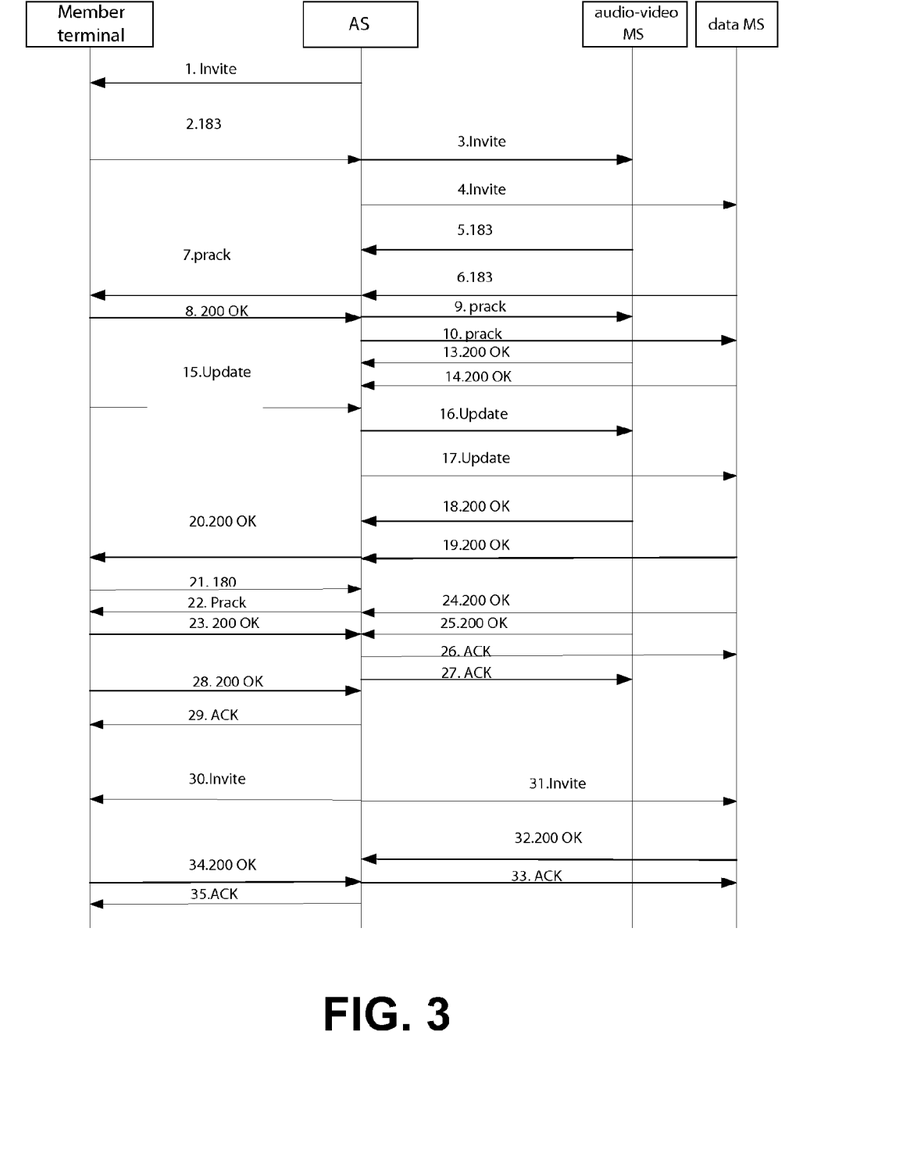
FIG. 3 is a flow chart of an AS processing a member when the AS invites the member to join a conference and the conference initiating terminal switches off a type of media channel.

FIG. 3 is the flow chart of the AS processing a member when the AS invites the member to join a conference and the conference initiating terminal switches off a type of media channel.

1, the AS invites a member by sending an Invite message without SDP to the member terminal;

2, the member terminal returns an offer SDP through a 183 message containing all supported media types; the AS, upon receiving the offer SDP returned by the member terminal, first saves the SDP, then extracts the m-line of the offer SDP which is consistent with the type of the held conference according to the media type of the conference which is currently held, divides these m-line into audio-video type (audio, video) and data type (application, wb), and assembles them into two new SDPs;

3-4, the AS delivers the two SDPs constructed in Action2 to an audio-video MS and a data MS via the Invite message respectively;

5, the audio-video MS first returns 183 message containing answer SDP, the AS saves the SDP and blocks the signaling flow from continuing, so as to wait for the answer SDP returned by the data MS;

6, the data MS returns the 183 message containing answer SDP, the AS constructs the SDPs returned by the audio-video MS and the data MS into an answer SDP which is returned to the member terminal, and in the case that there is no m-line in the SDPs of the both MSs, the AS sets its port to be 0;

7, the AS sends the constructed SDP to the terminal through a PRACK message;

8-14, the system completes the acknowledgement process of the response 183 message;

15-20, as Actions 13-18 shown in FIG. 2, after the user terminal resource reservation has been successful, the AS acknowledges it and negotiates with the two MSs;

21-23, the invited member terminal rings and the AS receives a ringing message from the member terminal;

24-27, the MS returns a final response of 200 OK message, and the AS sends an ACK message for acknowledgement;

28-29, the member picks up, and the member terminal returns the final response of 200 OK message, and the AS sends an ACK message for acknowledgement;

30, after the conference initiating terminal successfully switches off the type of media channel with m=wb, the AS needs to notify each member terminal to switch off the wb media channel of itself through the processes in which by using the received negotiated SDP of the member terminal as a template, the AS assembles the negotiated SDPs of the audio-video MS and the data MS, to construct one SDP answering the member terminal, wherein the wb port therein is set to be 0, then the assembled SDP is sent to the member terminal through the Invite message, so as to inform the terminal that the wb media channel has been switched off;

31, the AS shall inform the data MS while informing the member terminal, the AS extracts the m-line of data type from the member negotiated SDP, and sets the wb port therein to be 0, to construct one new SDP, and sends it to the data MS via the Invite message so as to notify the data MS to switch off the wb media channel corresponding to the member;

32-33, after receiving an answer SDP returned by the data MS through the 200 OK message, the AS updates the saved SDP, and then directly returns an ACK message without negotiation;

34-35, after receiving the answer SDP responded by the member terminal, the AS updates the saved SDP of the member terminal, then directly returns an ACK message.

FIGS. 2 and 3 show the processing executed by the AS during conference's normal holding and adding or deleting a media stream, wherein the process of adding one media channel or a media type is similar to that of the conference initiating terminal holding a conference and inviting a member to join in the conference, thus omitted herein. Some terminals, for example, the traditional PSTN telephone, do not support data conference, and therefore, when inviting such terminal to join in a conference, it is only possible for the terminal to join in an audio-video conference. When a terminal without data media capability is invited to join in a conference having data media, the AS selects a media device to negotiate with it according to a media capability contained in the offer SDP provided by the terminal. During the whole procedure of the media negotiation, the AS controls the terminal to interactively negotiate merely with the audio-video MS, so as to realize the compatibility with the terminal without data capability.

Apparatus Embodiments

Figure 4:
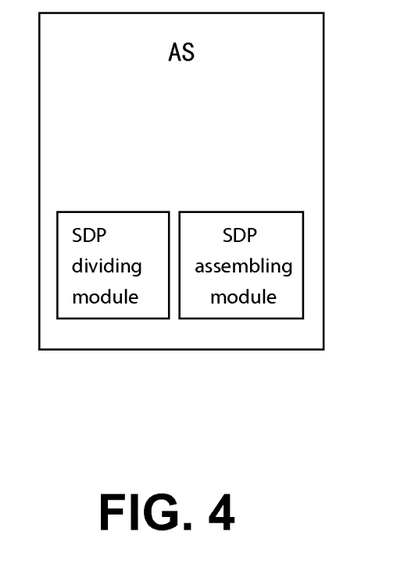
FIG. 4 is a block diagram of the principle of the apparatus of the present invention.

According to the embodiment of the present invention, an apparatus for controlling multimedia conference is provided. FIG. 4 is the block diagram of the principle of the apparatus of the present invention. As shown in FIG. 4, an AS comprises an SDP dividing module and an SDP assembling module, wherein, the SDP dividing module is configured to divide the m-line of the SDP sent by a terminal into two SDPs according to the media type; and the SDP assembling module is configured to assemble the SDPs returned by an audio-video media server and a data media server into one SDP.

Obviously, those skilled in the art shall understand that the above-mentioned modules and steps of the present invention can be implemented with general computation devices, and can be integrated in one computation device or distributed in the network formed by a plurality of computation devices, alternatively implemented with program codes executable by computation devices, which can be stored in memory devices for execution by the computation devices, or implemented with ICs, or several modules or steps can be implemented with a single IC. Thus, the present invention is not limited to any particular hardware and software combination.

Above description is merely to illustrate the preferred embodiments but not to limit the present invention. Various alterations and changes to the present invention are apparent to those skilled in the art. The scope defined in claims shall comprise any modification, equivalent substitution and improvement within the spirit and principle of the present invention.

What is claimed is:

1. A method for controlling a multimedia conference by an application server, AS, comprising:

in the multimedia conference, the AS dividing m-lines in a received terminal session description protocol, SDP, message into two SDP messages according to the type of media, and sending them respectively to an audio-video media server and a data media server, or assembling SDP messages returned by the audio-video media server and the data media server into one SDP message, and sending it to a terminal wherein when the conference initiating terminal of the multimedia conference initiates the conference, the method specifically comprises the following steps: the AS parsing the SDP message sent by the conference initiating terminal, obtaining the m-lines of the audio-video media and the data media, and classifying the m-lines; dividing the SDP message sent by the conference initiating terminal into two or more SDP messages according to the classification of the m-lines, and sending them respectively to the audio-video media server and the data media server; when the AS has received one SDP message returned by one of the audio-video media server and the data media server, and not yet received another SDP message returned by other one of the audio-video media server and the data media server, saving the SDP message of the one of the audio-video media server and the data media server and waiting for the SDP message of the other one of the audio-video media server and the data media server, and extracting the SDP message of the one of the audio-video media server and the data media server when receiving the SDP message of the other one of the audio-video media server and the data media server; the AS assembling the SDP messages returned by the audio-video media server and the data media server into one SDP message, and sending it to the conference initiating terminal;

wherein after the multimedia conference has been successfully initiated, if the conference initiating terminal needs to switch off a type of conference media channel, then after the AS assembling the SDP messages returned by the audio-video media server and the data media server into one SDP message, and sending it to the conference initiating terminal, the method further comprises the following steps: the conference initiating terminal setting the port of the m-lines corresponding to the media channel to be switched off in the SDP message to be 0, and sending it to the AS via the SIP message; the AS comparing the media type of the received SDP message with the media type of the conference currently in progress, and extracting the m-lines with the port being 0 in the SDP message, forming one new SDP message, and sending the new SDP message to a corresponding media server to notify it to switch off the corresponding media channel; the AS assembling the SDP messages of the two media servers corresponding to a member terminal into one new SDP message, sending it to the member terminal, to notify it to switch off the corresponding media channel, and extracting the m-lines corresponding to the media server of the media channel to be switched off in the SDP message of the member terminal, forming one new SDP message, and sending it to the corresponding media server; the port of the m-lines corresponding to media type to be switched off in the new SDP message is 0.

2. The method for controlling a multimedia conference by an application server according to claim 1, wherein when the conference initiating terminal of the multimedia conference needs to call a member, the method specifically comprises the following steps:

the AS sending a session initiation protocol, SIP message to the member terminal, and obtaining the SDP message of the member terminal;

the AS parsing the SDP message sent by the member terminal, obtaining the m-lines of the audio-video media and the data media, and classifying the m-lines;

dividing the SDP message sent by the member terminal into two SDP messages according to the classification of the m-lines, and sending the two SDP messages respectively to the audio-video media server and the data media server;

when the AS has received one SDP message returned by one of the audio-video media server and the data media server, and not yet received another SDP message returned by other one of the audio-video media server and the data media server, saving the SDP message of the one of the audio-video media server and the data media server and waiting for the SDP message of the other one of the audio-video media server and the data media server, and extracting the SDP message of the one of the audio-video media server and the data media server when receiving the SDP message of the other one of the audio-video media server and the data media server;

the AS assembling the SDP messages returned by the audio-video media server and the data media server into one SDP message, and sending it to the member terminal transparently.

3. The method for controlling a multimedia conference by an application server according to claim 1, wherein after the multimedia conference has been successfully initiated, if the conference initiating terminal needs to add a type of media channel, then after the AS assembling the SDP messages returned by the audio-video media server and the data media server into one SDP message, and sending it to the conference initiating terminal, the method further comprises the following steps:

the AS switching on the media channel corresponding to the media server with the port of the m-lines being 0, according to the SDP message sent by conference initiating terminal;

the AS notifying the member terminal supporting the type of media to switch on the corresponding media channel.

4. The method for controlling a multimedia conference by an application server according to claim 1, wherein the method for dividing SDP message is:

first extracting the session description portion of the SDP message sent by the conference initiating terminal, copying it directly to the divided SDP message as the session description portion; then classifying the m-line of the SDP message transmitted by the conference initiating terminal into an m-line set of audio-video media and an m-lines set of data media according to the media type, and copying the m-lines set of audio-video media and the m-lines set of data media respectively to the corresponding divided SDP messages as the media description portion.

5. The method for controlling a multimedia conference by an application server according to claim 1, wherein the method for assembling SDP message is:

first extracting the session description portion of the SDP message returned by the audio-video media server as the session description portion of an assembled SDP message, then according to the order of the m-lines in the SDP of the conference initiating terminal, assembling the m-lines of the SDP message returned by the audio-video media server and the data media server as the media description portion of the assembled SDP, if there is no corresponding m-lines in the SDP message returned by the audio-video media server or the data media server, setting the port of the m-lines to be 0.

6. The method for controlling a multimedia conference by an application server according to claim 1, wherein in the method, for the terminal without data media capability, the AS merely interactively negotiates with the audio-video media server corresponding to the terminal during the whole media negotiation process.

7. The method for controlling a multimedia conference by an application server according to claim 1, wherein in the method, if one media type needs to be switched off by the conference initiating terminal, the AS directly sending an ending message to corresponding one of the audio-video media server and the data media server, and using the SDP message of other one of the audio-video media server and the data media server to form an SDP message, in which the port of the m-lines of the media type of a switched-off media server is 0, sending the SDP mesaage to the conference initiating terminal, then switching off the media type corresponding to each member; if the whole conference needs to be switched off by the conference initiating terminal, the AS sending an ending message to all media servers, and forming an SDP message with all ports of m-lines being 0 and transmitting it to the conference initiating terminal, then sending an ending message to each member and the media server corresponding to it.

8. The method for controlling a multimedia conference by an application server according to claim 1, wherein the method for dividing SDP message is:

first extracting the session description portion of the SDP message sent by the conference initiating terminal, copying it directly to the divided SDP message as the session description portion; then classifying the m-lines of the SDP message transmitted by the conference initiating terminal into an m-lines set of audio-video media and an m-lines set of data media according to the media type, and copying the m-lines set of audio-video media and the m-lines set of data media respectively to the corresponding divided SDP messages as the media description portion.

9. The method for controlling a multimedia conference by an application server according to claim 2, wherein the method for dividing SDP message is:

first extracting the session description portion of the SDP message sent by the conference initiating terminal, copying it directly to the divided SDP message as the session description portion; then classifying the m-lines of the SDP message transmitted by the conference initiating terminal into an m-lines set of audio-video media and an m-lines set of data media according to the media type, and copying the m-lines set of audio-video media and the m-lines set of data media respectively to the corresponding divided SDP messages as the media description portion.

10. The method for controlling a multimedia conference by an application server according to claim 1, wherein the method for assembling SDP message is:

first extracting the session description portion of the SDP message returned by the audio-video media server as the session description portion of an assembled SDP message, then according to the order of the m-lines in the SDP message of the conference initiating terminal, assembling the m-lines of the SDP message returned by the audio-video media server and the data media server as the media description portion of the assembled SDP message, if there is no corresponding m-lines in the SDP message returned by the audio-video media server or the data media server, setting the port of the m-lines to be 0.

11. The method for controlling a multimedia conference by an application server according to claim 2, wherein the method for assembling SDP message is:

first extracting the session description portion of the SDP message returned by the audio-video media server as the session description portion of an assembled SDP message, then according to the order of the m-lines in the SDP message of the conference initiating terminal, assembling the m-lines of the SDP message returned by the audio-video media server and the data media server as the media description portion of the assembled SDP message, if there is no corresponding m-lines in the SDP message returned by the audio-video media server or the data media server, setting the port of the m-lines to be 0.

12. An apparatus for controlling a multimedia conference, comprising an application server, AS, further comprising a session description protocol, SDP, dividing module and an SDP message assembling module, the SDP message dividing module is configured to divide the SDP message sent by a terminal into two SDP messages according to the classification of the m-lines; the SDP assembling module is configured to assemble the SDP messages returned by an audio-video media server and a data media server into one SDP message wherein when the conference initiating terminal of the multimedia conference initiates the conference, the method specifically comprises the following steps: the AS parsing the SDP message sent by the conference initiating terminal, obtaining the m-lines of the audio-video media and the data media, and classifying the m-lines; dividing the SDP message sent by the conference initiating terminal into two or more SDP messages according to the classification of the m-lines, and sending them respectively to the audio-video media server and the data media server; when the AS has received one SDP message returned by one of the audio-video media server and the data media server, and not yet received another SDP message returned by other one of the audio-video media server and the data media server, saving the SDP message of the one of the audio-video media server and the data media server and waiting for the SDP message of the other one of the audio-video media server and the data media server, and extracting the SDP message of the one of the audio-video media server and the data media server when receiving the SDP message of the other one of the audio-video media server and the data media server; the AS assembling the SDP messages returned by the audio-video media server and the data media server into one SDP message, and sending it to the conference initiating terminal;

wherein after the multimedia conference has been successfully initiated, if the conference initiating terminal needs to switch off a type of conference media channel, then after the AS assembling the SDP messages returned by the audio-video media server and the data media server into one SDP message, and sending it to the conference initiating terminal, the method further comprises the following steps: the conference initiating terminal setting the port of the m-lines corresponding to the media channel to be switched off in the SDP message to be 0, and sending it to the AS via the SIP message; the AS comparing the media type of the received SDP message with the media type of the conference currently in progress, and extracting the m-lines with the port being 0 in the SDP message, forming one new SDP message, and sending the new SDP message to a corresponding media server to notify it to switch off the corresponding media channel; the AS assembling the SDP messages of the two media servers corresponding to a member terminal into one new SDP message, sending it to the member terminal, to notify it to switch off the corresponding media channel, and extracting the m-lines corresponding to the media server of the media channel to be switched off in the SDP message of the member terminal, forming one new SDP message, and sending it to the corresponding media server; the port of the m-lines corresponding to media type to be switched off in the new SDP message is 0.

* * * * *